United States Patent [19]

Hreha

[11] 4,326,336

[45] Apr. 27, 1982

[54] GAUGE

[76] Inventor: Michael J. Hreha, 415 Independence Ct., Fairport Harbor, Ohio 44077

[21] Appl. No.: 704,439

[22] Filed: Jul. 12, 1976

[51] Int. Cl.³ ............................................... G01B 5/08
[52] U.S. Cl. ............................... 33/174 Q; 33/172 B; 33/178 D
[58] Field of Search ............ 33/174 Q, 174 D, 172 R, 33/178 D, 172 B, 174 H

[56] References Cited

U.S. PATENT DOCUMENTS 2,965,970 12/1960 Rocheleau ........................ 33/172 B
3,387,374 6/1968 Gordon ............................. 33/172 B

FOREIGN PATENT DOCUMENTS 167640 of 1965 U.S.S.R. ........................... 33/174 Q

*Primary Examiner*—Willis Little
*Attorney, Agent, or Firm*—John Harrow Leonard

[57] ABSTRACT

The gauge is a flat metal block with a precisely finished planar bottom face by which it can be supported on the upper planar face of a conventional granite gauge block for lateral sliding therealong while retaining a fixed angular relation to the planar face of the block. The base has an open end V-slot with planar faces which extend at 90° to the plane of the bottom face, from the bottom to the top of the base, and which diverge outwardly at 90° to each other to, and open through, a side of the base, to provide positioning jaws. The base, while resting on the granite block, can be slid to cause these faces of the positioning jaws to engage the circumferential wall of an article of circular cross section while one end of the article rests on the face of the granite block. The base carries one or more generally upright supporting posts arranged to detachably support, in adjusted positions, dial indicators of the movable feeler type with the feelers in operative engagement with circumferential and upper end surfaces, respectively, of the article while the article is rotated about its axis with its circumferential surface held against the jaw faces.

The gauge is useful for checking, concurrently, out-of-roundness, dimensional accuracy and centricity of internal and external diameters of annular articles, and of their laterally exposed circumferential surfaces, angular relations of the ends of an article to the laterally exposed surfaces and to each other; and squareness of the end surfaces relative to the axis of the article or to the face of the granite gauge block.

8 Claims, 6 Drawing Figures

GAUGE

BACKGROUND OF INVENTION

1. Field of Invention

Gauges.

2. Prior Art

Heretofore gauges have been provided for testing cylindrical objects for out-of-roundness, dimensional accuracy, and surface deformations. Typical of these prior gauges is an elongated base block with a pair of jaws elongated endwise of the base block and divergent from a point within the base upwardly to and through the upper face of the base. The faces of the two jaws are planar. A cylindrical article can be laid between the jaws and supported thereby in a non-tilting relation and rotated about its axis and shifted endwise while so supported. The base carries a conventional post on which a feeler type dial gauge is supported with its feeler in contact with the periphery of the article. The article is then slid endwise of the base to different positions and there rotated about its axis to check roundness and dimensional accuracy and the like of its circumferential surface at different locations along its length. There is no means for holding the article in a fixed position endwise of the base or jaws, and no end stop having a planar gauging surface normal to the axis of the article. Accordingly its field of application is limited.

SUMMARY

In the present gauge, the base is preferably a flat, relatively thin block machined on one face to provide one or more under surface areas which define a plane and which, in the horizontal position of the plane, can engage and slide along the horizontal planar gauging face of a conventional granite gauging block to various locations and support the base in fixed annular relation to the plane of the gauging face of the block in all of said locations. The base has a V-slot which, endwise of its axis, extends endwise of the base through and from the under face and to and through the upper face of the base. The V-slot is defined by planar side wall faces which, beginning near the lateral midportion of the base, diverge from each other to, and open through, one edge of the base. The faces defining the V-slot are planar and preferably are at a right angle to the plane defined by the under surface of the base. Supporting posts are detachably mounted on the base for supporting dial indicators in positions in which they can engage the periphery of an article at its upper end or on its laterally exposed wall surfaces while the lower end of the article rests on the granite block, and that portion of the circumferential wall of the article, at a location closely adjacent the lower end of the article, is juxtaposed against the two positioning jaw faces of the V-slot. As a result, the gauge can be manipulated to gauge, concurrently, the following: the angular relation of the ends of the article relative to each other and to the axis and circumferential walls of the article; centricity and dimensional accuracy of internal and external diameters of annular articles; the endwise taper of the circumferential wall of frusto-conical or spherical articles, and the like. These gauging operations can be effected concurrently simply by placing the article with its circumferential wall, at a location closely adjacent its lower end, in engagement with the faces of the V-slot, and with its lower end resting on the granite block, and rotating the article while it is held in this position.

Other objects and advantages will become apparent from the following description wherein reference is made to the drawings.

Figure 1:
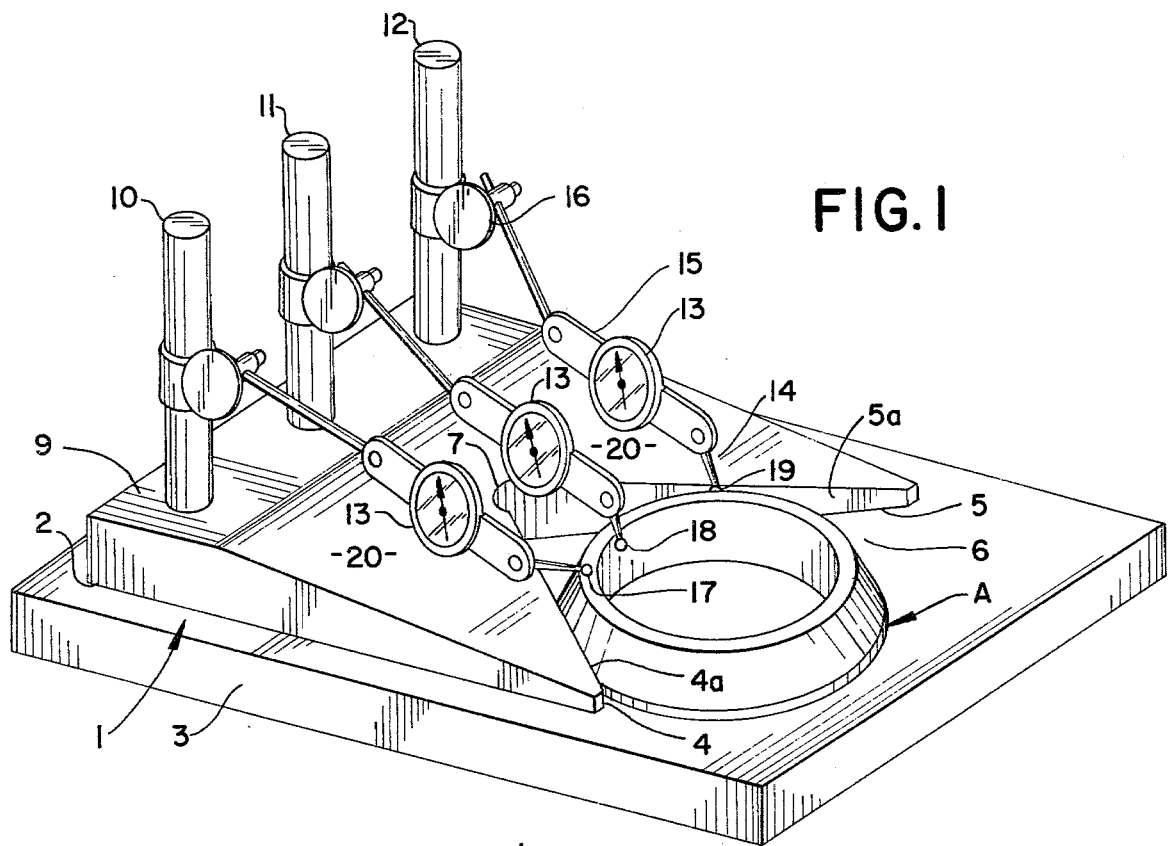
FIG. 1 is a perspective view of a preferred form of a gauge embodying the principles of the present invention.
Figure 2:
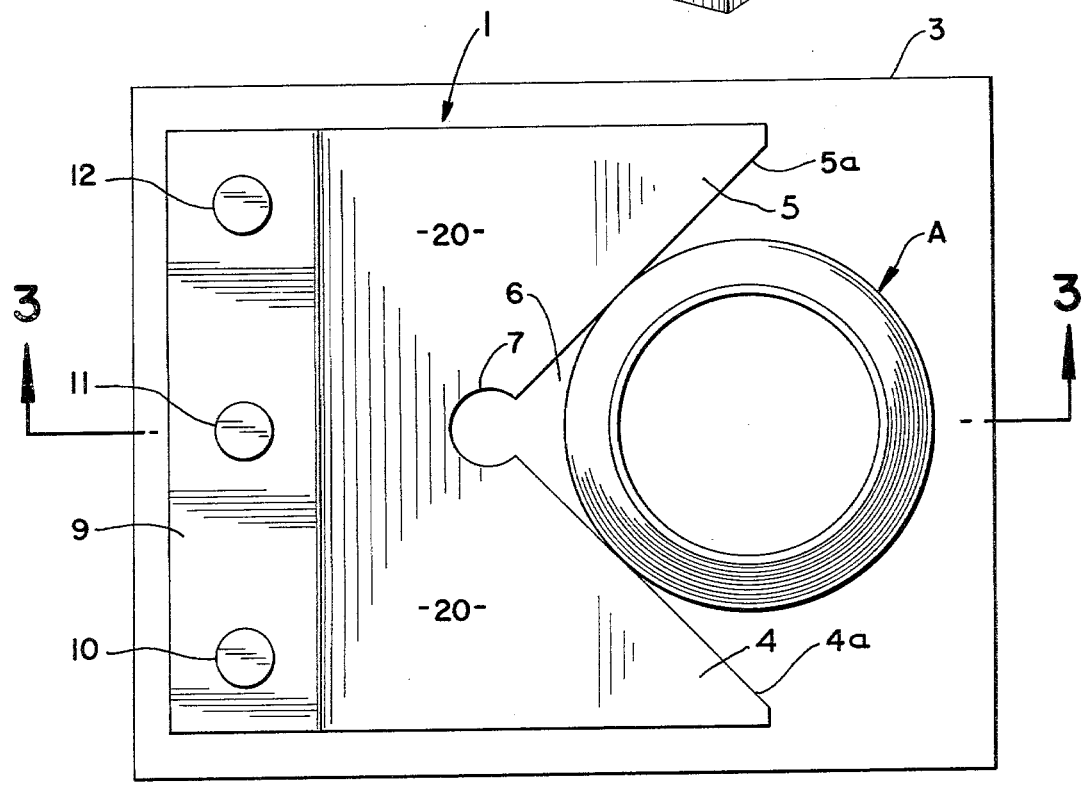
FIG. 2 is a top plan view of the gauge illustrated in FIG. 1.
Figure 3:
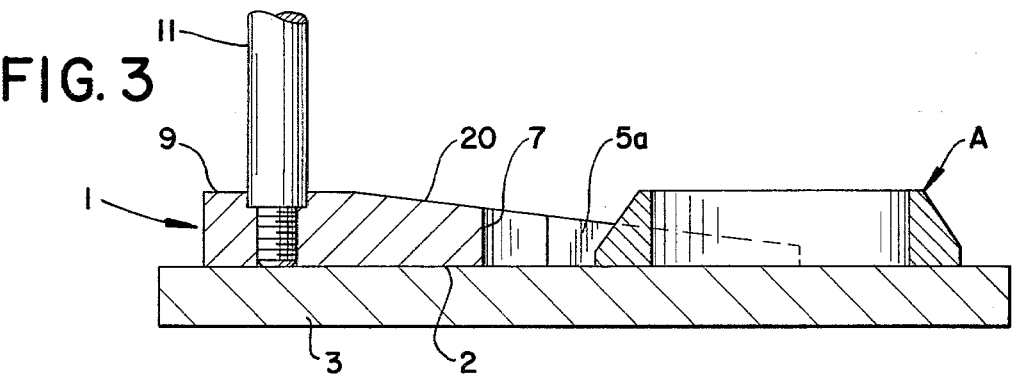
FIG. 3 is a cross sectional view of the gauge taken on the line 3—3 of FIG. 2.
Figure 4:
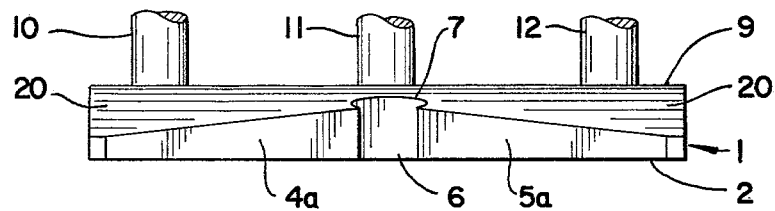
FIG. 4 is a right side elevation of the gauge illustrated in FIG. 2.

Referring to the drawings, the gauge comprises a base, indicated generally at 1, which preferably is in the form of a flat metal block having its under face 2 machined or ground precisely to provide a planar supporting surface, or a plurality of spaced surface areas which, together, define a planar supporting surface, by which the block can be supported on the planar upper gauging face of a conventional granite gauge block 3 and can be slid about thereon to preselected locations while maintaining a fixed angular relation to the gauging face of the granite block. The base 1 is provided with positioning jaws 4 and 5 which preferably are the sides of a V-slot 6 which extends endwise of the base 1 from and through the under face 2 to and through the upper face of the base 1. The jaws extend from a small central bore 7 in divergent relation to each other in a direction outwardly to and through one side of the base 1. The faces 4a and 5a of the jaws 4 and 5, respectively, are lineal from their inner to their outer ends, and preferably are planar and normal to the plane defined by the planar supporting surface at the under face of the base 1, or to the face of the granite block 3 when the base 1 is resting thereon. The faces 4a and 5a of the jaws 4 and 5 preferably diverge from each other at 90°.

Thus, as illustrated in FIG. 1, an article A of circular cross section, at least near one end, may be stood on that end on the granite block 3 and the base 1 then slid theretowards so as to engage the circumferential wall of the article A, near that end, at two circumferentially spaced locations thereon. The article A is thereby positioned in a fixed lateral position with its axis on the line bisecting the 90° angle between the faces 4a and 5a of the jaws 4 and 5. In this position, assuming the article A is a frustoconical annulus as illustrated, the article A is in a position for gauging the squareness or angular relation of the ends relative to the axis and circumference of the article, and to each other, and for gauging the internal and external diameters for dimensional accuracy, out-of-roundness, and centricity of both the internal and external diameters and surfaces.

For this purpose, the base 1 is provided with a plurality of detachable posts, such as the posts 10, 11 and 12, each of which extends upright normal to the planar supporting under surface of the base 1. Each of the posts carries a conventional dial gauge, such as indicated at 13, having a feeler 14 for engaging the surface to be gauged. As is conventional, each of these indicators is carried on a stem 15 having pivoted clamps 16 by which it can be supported on the post, such as the post 12, in preselected adjusted positions vertically of the post, circumferentially of the post, and in tilted relations thereto. Thus a number of indicators can be placed with their feelers in operative contact with different portions of the article concurrently, and used for indications while the lower end of the article rests on the gauging surface of the granite block 3 and the circumferential wall of the article, near the bottom of the article, engages the faces 4a and 5a of the jaws 4 and 5. In the illustrative example, one indicator is placed with its feeler on the upper end surface of the article A, as indicated at 17, another with its feeler on the internal bore wall, as indicated at 18, and another with its feeler on the external circumferential wall, as indicated at 19. With the indicators thus positioned, the article can be rotated and any discrepancies in the angular relation of the ends, sides, and external and internal diameters, and in the centricity of the circumferential walls, and the axis of the article, and out-of-roundness and the like, and readily be detected.

In some articles, such as the article A illustrated, it is desirable that the feeler of one of the indicators be placed against the circumferential wall as near to the bottom of an article as possible. To facilitate access to this wall portion, the upper surface 9 of the base 1, as indicated at 20, is tapered, from a point near the posts toward the opposite edge or open side of the V-slot at an angle of about 7°, or possibly more, to the plane of the under face, depending upon how close to the bottom end of the article the circumferential surface of the article A is to be tested. Thus one can gauge concurrently the parallelism and angular relation of the upper end of the article A relative to the bottom end, the angular relation of the ends to the circumferential surfaces, the squareness of the ends relative to the longitudinal axis of the article, the endwise slope of frusto-conical surface, the out of roundness and dimensional accuracy of the internal and external walls, and the centricity of the various surfaces of revolution, external and internal diameters.

In effect, the granite block supplements the V-type positioning jaws by acting as an end stop which holdes the article in fixed position axially or endwise relative to the jaws and further maintains the lower end of the article, which usually is intended to be normal to the axis of the article, in the fixed plane of the gauging face of the gauge block 3 during rotation of article about its axis while in contact with the jaw faces 4a and 5a.

Figure 5:
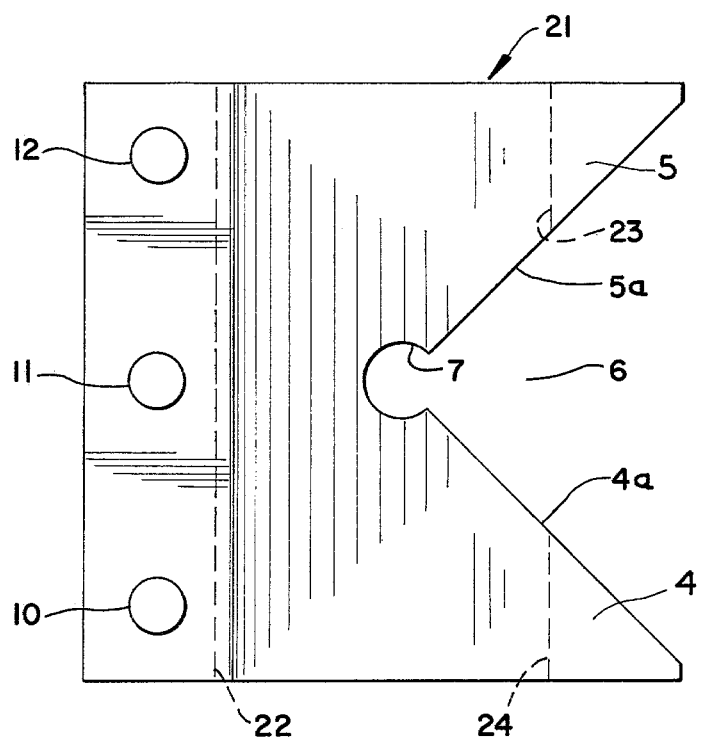
FIG. 5 is a top plan view of a modified form of a gauge.
Figure 6:
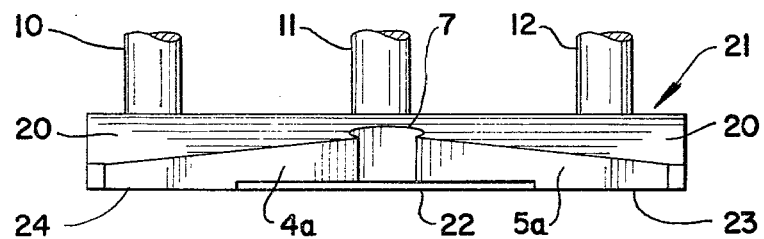
FIG. 6 is a right side elevation of the gauge shown in FIG. 5.

Referring next to FIGS. 5 and 6, a like gauge to that of FIGS. 1 through 4, is illustrated, its base block being indicated at 21. The only difference from the structure of FIGS. 1 through 4 is that, instead of the under face of the base 21 being a continuous planar face, the under face is machined or ground to provide feet, as indicated at 22, 23 and 24, which have bottom faces lying in a common plane disposed slightly below the remainder of the under face of the base block 21. Preferably three such feet are employed, thus providing a "three-point" support for the base.

In the disclosure and claims, the under or bottom surface of the base or block is described as planar, and this wording applies to both forms of the invention.

Having thus described my invention, I claim:

1. A gauge device comprising:
   a base having a top face and a bottom underface with supporting surface areas on the lowest extremity of its underface defining a plane supporting face which is adapted to rest slidably on the upper planar face of a granite gauging block and operative to slide on said upper planar face of the block in all directions parallel to said planar face and to support the base in fixed angular relation to the plane of said planar face in all positions into which the base is moved on said planar face;
   a pair of positioning jaws on, and in fixed relation to, the base and having opposed faces arranged in divergent relation from each other from a location within the periphery of the base, which location is inwardly from a side wall of the base, outwardly to, and opening through, said side wall;
   said opposed faces of said pair of jaws extending entirely through the base from top to bottom;
   at least one supporting post mounted on the base and extending upwardly therefrom in fixed position axially, circumferentially, and transversely of the post relative thereto,
   a support,
   said support being mounted on said post and movable to different positions, both axially and circumferentially relative to the post;
   means connected to the support and post and operable to clamp the support fixedly in said preselected positions,
   said support being adapted to detachably support an adjustable dial indicator having a movable contact feeler, in preselected positions relative to said support in all of said preselected fixed positions of the support, relative to the post and jaws, in which positions its movable contact feeler can be engaged, under light pressure selectively directly against various selected angularly related peripheral surface areas of an article resting on its own base on the gauge block, by movement of said gauge base on said block and while said jaws are held in engagement with said peripheral surface areas;
   said defined plane supporting face on the underface of the gauge base being of such lateral extent that the gauge base, in and of itself, is capable, while resting on said planar face and supporting said post, of maintaining its said fixed angular relation to the plane of said planar supporting face.

2. A gauge device according to claim 1 wherein each of said jaws has an article engaging surface which is lineal in a direction from its inner end to its outer end.

3. A gauge device according to claim 2 in which said jaw surfaces are planar.

4. A gauge device according to claim 3 in which said planar jaw surfaces are at 90° to said defined plane.

5. A gauge device according to claim 1 wherein said jaws are shaped to be maintained in engagement concurrently with the outer peripheral outwardly convex curvilinear surface of an article at circumferentially spaced locations thereon, which surface is circular in the cross section of the article in a plane normal to the article axis, while an end of the article is resting on the granite block so that the article can be rotated, while engaged by the jaws, approximately about its true axis.

6. A gauge device according to claim 1 wherein the upper face of the base slopes, from a location spaced from the outer end of the jaws, toward said defined plane in a direction toward the outer ends of the jaws.

7. A gauge device according to claim 1, further including said adjustable dial indicator having a movable contact finger; and attaching means connecting the indicator to the post for adjustment to preselected fixed positions relative to the post, and base, and operable to secure the indicator fixedly relative to the post and base, in the positions selected, respectively.

8. A gauge device comprising:

a granite gauge block having an upper horizontal, planar face;

a base member;

said member having a top face, and a bottom underface with supporting surface areas on the lowest extremity of said underface defining a planar supporting face operative to support the member on the upper horizontal planar face of the granite gauge block in fixed angular relation to the plane of said face and for sliding on said upper planar face in all directions parallel to said upper planar face while in said fixed angular relation;

a pair of jaws on, and in fixed relation to, the member and having opposed faces arranged in divergent relation to each other, and open at one side of the member so that the base member can be moved along said upper face of the gauge block while resting thereon, to cause the peripheral wall of an article resting on the gauge block to be in engagement, at spaced locations on said peripheral wall, with both jaws concurrently;

at least one post carried by, and in fixed relation to, the base member, in spaced relation to said opposed faces of the jaws;

an indicator gauge of the contact feeler type mounted on the post and adjustable to different preselected positions relative thereto;

means to secure the gauge to the post in fixed preselected positions relative to the post and jaws in each preselected position of the gauge relative to the post, during a gauging operation, with the feeler in engagement, under light pressure, with a surface, to be gauged, of the article while the jaws are held in said engagement with the article and the article is resting on said upper face; and said defined planar supporting face of the base member being of such lateral extent that said base member, in and of itself, is capable, while resting on said upper horizontal planar face and supporting the post, of maintaining its said fixed angular relation to the plane of said upper horizontal planar face.

* * * * *